United States Patent [19]

Ishikawa

[11] 4,160,925
[45] Jul. 10, 1979

[54] QUADRUPLE FREQUENCY CONVERTER

[75] Inventor: Fujio Ishikawa, Yokohama, Japan

[73] Assignee: Toyo Denki Seizo Kabushiki Kaisha, Tokyo, Japan

[21] Appl. No.: 820,458

[22] Filed: Aug. 1, 1977

[30] Foreign Application Priority Data

Aug. 18, 1976 [JP] Japan .................................. 51-97794

[51] Int. Cl.² ......................................... H02K 47/18
[52] U.S. Cl. .................................... 310/160; 310/169; 310/170
[58] Field of Search .............. 310/129, 160, 169, 168, 310/170, 269

[56] References Cited

U.S. PATENT DOCUMENTS

| | | | |
|---|---|---|---|
| 1,800,027 | 4/1931 | Merrill | 310/160 |
| 1,800,028 | 4/1931 | Merrill | 310/160 |
| 1,905,660 | 4/1933 | Von Platen | 310/160 |
| 2,023,245 | 12/1935 | Schou | 310/160 |
| 2,428,203 | 9/1947 | Creedy | 310/160 |
| 3,177,387 | 4/1965 | Leischner | 310/160 |
| 3,197,660 | 7/1965 | Leischner | 310/160 |

*Primary Examiner*—Donovan F. Duggan
*Attorney, Agent, or Firm*—Phillips, Moore, Weissenberger, Lempio & Majestic

[57] ABSTRACT

A rotary machine type quadruple frequency converter of which a stator is mounted with a primary and a secondary winding having a pole ratio of 1 to 4. The rotor is arranged to have the same number of poles as the number of poles of the primary winding. The rotor pole is arranged to have a shape for producing magnetic flux of 4th harmonics of the source frequency which is supplied to the primary winding. A quadruple frequency power is generated on the secondary winding operating the converter with the source frequency power.

4 Claims, 7 Drawing Figures

QUADRUPLE FREQUENCY CONVERTER

BACKGROUND OF THE INVENTION

1. Field of the Invention

The present invention relates to a quadruple frequency converter using a synchronous rotating machine.

2. Description of the Prior Art

Frequency converters for obtaining quadruple frequency of a source frequency are known. One such known frequency converter is a static type frequency converter using semiconductor devices. Also, a rotating machine type frequency converter based on the principle of a motor-generator is known. The latter type, i.e., the rotating machine type is suitable as an electric source for high speed motors of small capacity used in the construction field or the like by the reason of its low cost and robustness.

The conventional rotating type frequency converters are mainly of the motor-generator type, in which an ac generator is driven by an ac motor. This type requires two rotating machines so that it generally becomes costly and troublesome to maintain due to the presence of slip rings and brushes, which tend to wear and cause trouble.

SUMMARY OF THE INVENTION

The present invention is intended to realize a quadruple frequency converter of the rotating machine type which requires only a single magnetic core and is able to eliminate slip rings and brushes. This machine is so called maintenance free and can be made of robust construction at a low cost.

BRIEF EXPLANATION OF THE DRAWINGS

FIGS. 1 and 2 are schematical cross-sectional views of the frequency converter of the present invention for explaining its basic principles, in which FIG. 1 is a longitudinal section showing the upper half portion only, and FIG. 2 is another cross-section taken along line II—II of FIG. 1;

DETAILED EXPLANATION OF THE PREFERRED EMBODIMENTS

The invention using a reaction type synchronous machine, will now be described by referring to the accompanied drawings showing embodiments of the present invention.

Figure 1:
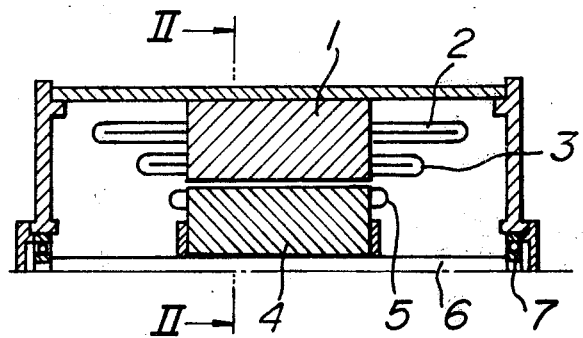

FIG. 1 is a longitudinal section along the shaft of the frequency converter made in accordance with the present invention. The drawing shows the upper portion only for simplifying the drawing.

The frequency converter comprises a stator and rotor like a usual reaction type synchronous machine. A rotor core 4 is mounted on a shaft 6, which is supported by bearings 7 in a manner to allow the rotor to freely rotate about its shaft 6. The rotor core 4 is equipped with damper windings 5.

A stator core 1 has nearly the same construction with that of the usual synchronous motor. However, what is different is that the stator core 1 according to the present invention has two windings 2 and 3 mounted thereon.

These two windings 2 and 3 are arranged to have a different number of poles having the ratio 1 to 4. The winding having less number of poles is termed the primary winding. In this particular embodiment, the winding 2 is the primary winding and the number of poles is 2.

The other winding having more number of poles is termed the secondary winding. In this particular embodiment, the winding 3 is the secondary winding and the number of poles is 8.

Figure 2:
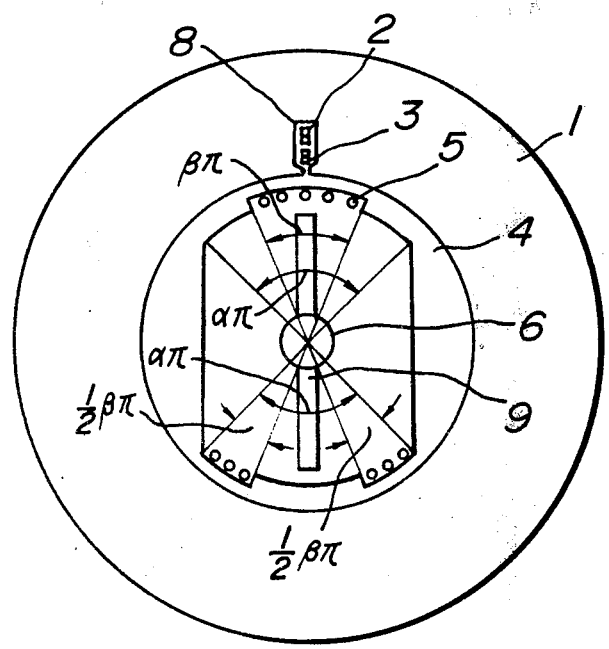

In the cross-section of FIG. 2, the reference numerals 1, 2, 3, 4, 5 and 6 denote the same parts as have been explained with respect to FIG. 1.

$\alpha$ is the ratio of the length of pole arc against the pole pitch of the rotor 4. $\beta$ is the ratio of the length of the portion having a narrower air gap in the respective pole arc against the pole pitch of the rotor core 4.

The stator core 1 is provided with a plurality of slots 8, in which the primary winding 2 and the secondary winding 3 are mounted. In the drawing only one of the slots 8 is shown.

The rotor core 4 has poles in the same number as that of the primary winding 2. In the present embodiment shown in FIG. 2, the number of poles is 2. The pole shown on the upper side in FIG. 2 is termed a convex pole and it has the air gap in the middle portion narrower than that in the outer portions. The pole shown on the lower side in FIG. 2 is termed a concave pole and it has the air gap in the middle portion wider than that in the outer portions.

The rotor core 4 is provided with slits 9 in order to increase magnetic reluctance in the quadrature magnetic path. The shaft 6 of the rotor is made of non-magnetic material so as to increase magnetic reluctance in the quadrature magnetic path. The rotor and stator are also arranged to have a substantially large magnetic reluctance except through the air gap.

Now we may consider the condition in which the primary winding 2 is connected to a polyphase ac source and excited therefrom. If we assume the permeability of the iron to be infinite, every portion of the rotor core becomes magnetically equipotential.

In an ordinal reaction motor, the magnetic potential of the rotor core is kept at zero potential. However, in the frequency converter according to the present invention, the shape of the air gap is different for the convex pole and for the concave pole and hence the permeance is different for each of the poles. Accordingly, the ampere-turn to be consumed in the air gap is different for each pole. However, the winding is wound uniform so that the same amount of magnetomotive force is given for each air gap. This results in having the rotor at a certain magnetic potential. This magnetic potential is expressed by $\xi$.

If we neglect the flux fringing, the flux density in the air gap is proportional to the ampere-turn applied to the air gap and is inversely proportional to the length of the air gap.

Figure 3:
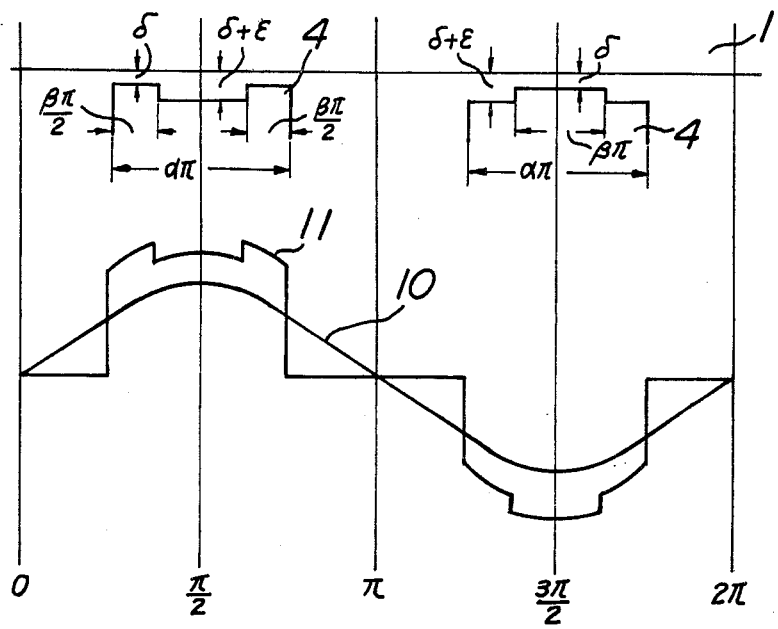
FIG. 3 is a linearly extended view of the air gap of the converter shown in FIG. 2 at a time when the center of a rotor magnet pole coincides with the magnetomotive force axis of the primary winding; the drawing also shows the shape of the pole surfaces together with wave forms of magnetomotive force and flux produced therein.

FIG. 3 shows a linearly extended view of the air gap shown in FIG. 2 to clearly indicate the shape of the pole surface of the rotor core 4 along the air gap and the relation between the magnetomotive force wave 10 of the primary winding and the produced space flux wave 11 appearing in the air gap. FIG. 3 shows the position of the rotor in which the center of the rotor pole 4 coincides with the center of the magnetomotive force of the primary winding 2.

If we assume the magnetomotive force of the primary winding A, the ampere-turn consumed at any point of the air gap of the convex pole is as follows.

$$-A \sin \theta + \xi$$

wherein, $\theta$ is the distance angle measured from 0 in FIG. 3.

The ampere-turn consumed in the air gap of the concave pole is also as follows.

$$A \sin \theta - \xi$$

If we define the flux of the convex pole per unit length of the core in the axial length $\phi_H$ and that of the concave pole $\phi_L$ and further the inner diameter of the stator D, we get the following equations.

$$\phi_H = \frac{4\pi}{10} D \int_{\pi + \frac{1}{2}(1-\alpha)\pi}^{\pi + \frac{1}{2}(1-\beta)\pi} \frac{-A \sin \theta + \xi}{\delta + \epsilon} d\theta + \frac{4\pi}{10} D \int_{\pi + \frac{1}{2}(1-\beta)\pi}^{\pi + \frac{\pi}{2}} \frac{-A \sin \theta + \xi}{\delta} d\theta$$

$$= \frac{4\pi}{10} \left\{ \frac{AD}{\delta + \epsilon} \left( \sin \frac{\alpha\pi}{2} - \sin \frac{\beta\pi}{2} \right) + \frac{\xi D}{2(\delta + \epsilon)} (\alpha - \beta)\pi + \frac{AD}{\delta} \sin \frac{\beta\pi}{2} + \frac{\xi D}{2\delta} \beta\pi \right\}$$

$$\phi_L = \frac{4\pi}{10} D \int_{\frac{1}{2}(1-\alpha)\pi}^{\frac{1}{2}(1-\alpha+\beta)\pi} \frac{A \sin \theta - \xi}{\delta} d\theta + \frac{4\pi}{10} D \int_{\frac{1}{2}(1-\alpha+\beta)\pi}^{\frac{\pi}{2}} \frac{A \sin \theta - \xi}{\delta + \epsilon} d\theta$$

$$= \frac{4\pi}{10} \left[ \frac{AD}{\delta} \left\{ \sin \frac{\alpha\pi}{2} - \sin \frac{1}{2}(\alpha - \beta)\pi \right\} \right.$$

$$\left. + \frac{AD}{\delta + \epsilon} \sin \frac{1}{2}(\alpha - \beta)\pi - \frac{\xi D}{2\delta} \beta\pi - \frac{\xi D}{2(\delta + \epsilon)} (\alpha - \beta)\pi \right]$$

Where $\phi_H$ should be equal to $\phi_L$, then we can solve $\xi$ from the above equations as follows.

$$\xi = \frac{A}{\pi} \left\{ \left( \sin \frac{\alpha\pi}{2} - \sin \frac{\beta\pi}{2} \right) - \right.$$

$$\left. \sin \frac{1}{2}(\alpha - \beta)\pi \right\} \frac{\epsilon}{\delta\alpha + \epsilon\beta}$$

The above equation shows that the rotor has a certain amount of magnetic potential so it becomes necessary to arrange the rotor and the stator to have a substantially magnetic reluctance except through the air gap.

The right hand term of the above equation is all decided by the values given in the drawing except A so that it may be rewritten as follows.

$$K = \xi A$$

This constant K is decided by values such as $\alpha$, $\beta$, $\delta$, $\epsilon$. The possible actual value of K is as follows.

$$K = 0.02 \text{ to } 0.15$$

This means that the magnetic potential of the rotor is at the value of 2%–15% of the primary magnetomotive force.

As mentioned above the flux density in the air gap is proportional to the consumed ampere-turn and inversely proportional to the length of the air gap so that we get following relation.

$$(\text{Flux density}) = \frac{4\pi}{10} (A \sin \theta - \xi)/(\text{Air gap length})$$

The space flux wave 11 of FIG. 3 is obtained from the above equation.

If we analyze the space flux wave in Fourier's series, the amplitude $b_1$ of the fundamental flux wave and the amplitude $a_4$ of the 4th harmonic flux wave are given as follows.

$$b_1 = \frac{4\pi}{10} \frac{A}{\pi\delta} \left[ \frac{1}{2} \left\{ (\sin\alpha\pi + \sin\beta\pi) - \sin(\alpha - \beta)\pi + 2\beta\pi \right\} \right.$$

$$\left. - 2K \left\{ \left( \sin \frac{\alpha\pi}{2} - \sin \frac{\beta\pi}{2} \right) - \sin \frac{1}{2}(\alpha - \beta)\pi \right\} \right]$$

$$+ \frac{4\pi}{10} \frac{A}{\pi(\delta + \epsilon)} \left[ \frac{1}{2} \left\{ (\sin\alpha\pi - \sin\beta\pi) + \sin(\alpha - \beta)\pi + 2(\alpha + \beta)\pi \right\} \right.$$

$$\left. + 2K \left\{ \left( \sin \frac{\alpha\pi}{2} - \sin \frac{\beta\pi}{2} \right) - \sin \frac{1}{2}(\alpha - \beta)\pi \right\} \right]$$

-continued $$a_4 = -\frac{4\pi}{10} \frac{A}{\pi\delta} \left(\frac{\delta}{\delta + \epsilon} - 1\right) \left[\frac{1}{3} \left(\sin\frac{3}{2}\alpha\pi - \sin\frac{3}{2}\beta\pi\right)\right.$$

$$+ \frac{1}{5}\left(\sin\frac{5}{2}\alpha\pi - \sin\frac{5}{2}\beta\pi\right) - \frac{1}{3}\sin\frac{3}{2}(\alpha - \beta)\pi - \frac{1}{5}\sin\frac{5}{2}(\alpha - \beta)\pi$$

$$\left. + \frac{K}{2}\{-\sin 2\beta\pi + \sin 2(\alpha - \beta)\pi\}\right] - \frac{4\pi}{10}\frac{A}{\pi\delta}\left(\frac{\delta}{\delta + \epsilon} + 1\right)\frac{K}{2}\sin 2\alpha\pi$$

As an example, if we substitute into the above equations the following values:
$\alpha = 0.5$,
$\beta = 0.25$,
$\delta = 0.35$,
$\epsilon = 0.35$,
then $b_1$ and $a_4$ are calculated as follows.

$$b_1 = 0.613 \frac{A}{\delta} \frac{4\pi}{10}$$

$$a_4 = -0.142 \frac{A}{\delta} \frac{4\pi}{10}$$

The above equations mean that the fundamental flux wave has an amplitude corresponding to 61.3% of the amplitude of the space flux wave when the air gap is uniform and is equal to $\delta$ (i.e. cylindrical rotor) and the 4th harmonic flux wave has an amplitude corresponding to 14.2% of the same.

As explained above, the space flux wave in the air gap contains mainly the fundamental flux wave and the 4th harmonic flux wave.

Since the rotor 4 has the same number of poles as the primary winding 2, the rotor 4 rotates at the synchronous speed with the fundamental frequency (i.e. the electric source frequency). The secondary winding 3 has a number of poles 4 times as many as that of the primary winding 2 and hence it induces voltage of the 4th harmonics.

This means that the frequency converter according to the present invention is able to obtain power output having a frequency of 4 times the electric source frequency from the secondary winding by applying the power of the electric source frequency to the primary winding using a single unit rotating machine.

The converter can be made small at low cost due to its simple and robust construction. Further, it has advantageous features of so called maintenance-free construction due to the elimination of parts that can wear, such as slip rings and brushes.

In the foregoing explanation, the values of $\alpha$, $\beta$, $\delta$, $\epsilon$ are assumed the same, at the convex pole and the concave pole, and moreover the air gap in the wide portion and in the narrow portion of the pole is assumed to have uniform length to simplify the explanation.

However, the quadruple frequency power can be derived more efficiently and powerfully by making the values $\alpha$, $\beta$, $\delta$, $\epsilon$ to be different in the convex pole and in the concave pole and by making the air gap in a more suitable curved form. Further, the magnetic potential of the rotor 4 can be made zero.

Figure 4:
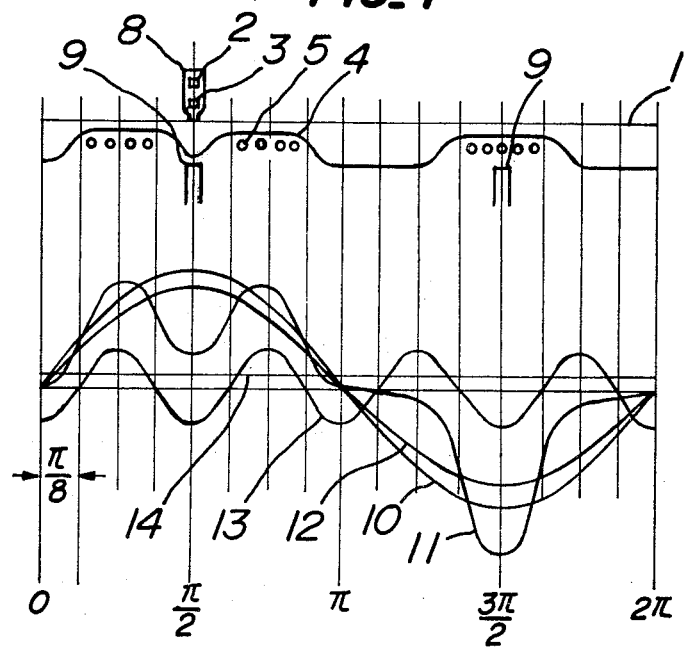
FIG. 4 is a linearly extended view of the air gap having a more practical construction.

FIG. 4 shows a more practical shape of the rotor embodying the above idea together with the magnetomotive force wave 10 of the primary winding and the space flux wave 11 in the air gap. The drawing further shows the fundamental flux wave 12, the 4th harmonic flux wave 13 and the dc component flux 14 included in the space flux wave 11.

In FIG. 4, reference numerals 1, 2, 3, 4, 5, 8, 9 are the same components as illustrated in FIG. 2.

The space flux wave 11 becomes more smooth in this embodiment since the magnetic pole surface is made of a more smooth curvature compared with the space flux wave 11 shown in FIG. 3. The values of $\alpha$, $\beta$, $\delta$, $\epsilon$ become different for the convex pole and for the concave pole in this case.

The values $b_1$, $a_4$ and $k$ calculated for one embodiment of the frequency converter having the pole surface substantially illustrated in FIG. 4 are as follows.

$$b_1 = 0.57 \frac{A}{\delta} \frac{4\pi}{10}$$

$$a_4 = 0.35 \frac{A}{\delta} \frac{4\pi}{10}$$

$$K = 0.08$$

From the above values, it can be understood that the value $a_4$ shows a substantial increase compared with that having the pole shape shown in FIG. 2. Moreover, it should be noted that other harmonic flux waves decrease considerably in this case.

This means much larger power of the quadruple frequency can be derived from the same stator.

Figure 5:
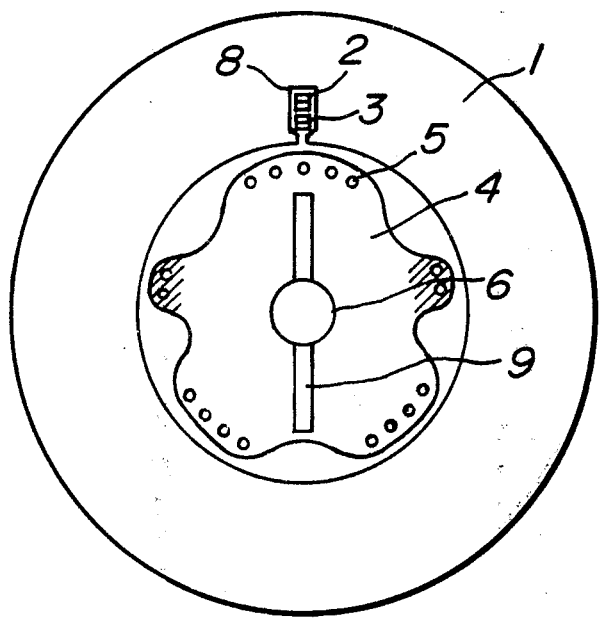
FIG. 5 is a cross-sectional view of a converter having a further improved practical feature.

FIG. 5 shows a further embodiment of the present invention, in which small magnetic poles are additionally provided at a location apart by less than $\pm \frac{1}{2}\pi$ from the center of the convex pole in order to obtain the quadruple output power more efficiently. The small additional poles are shown by hatched lines in FIG. 5. In FIG. 5, the portions shown by reference numerals of 1, 2, 3, 4, 5, 6, 8 and 9 show the same parts as in the FIG. 2.

Figure 6:
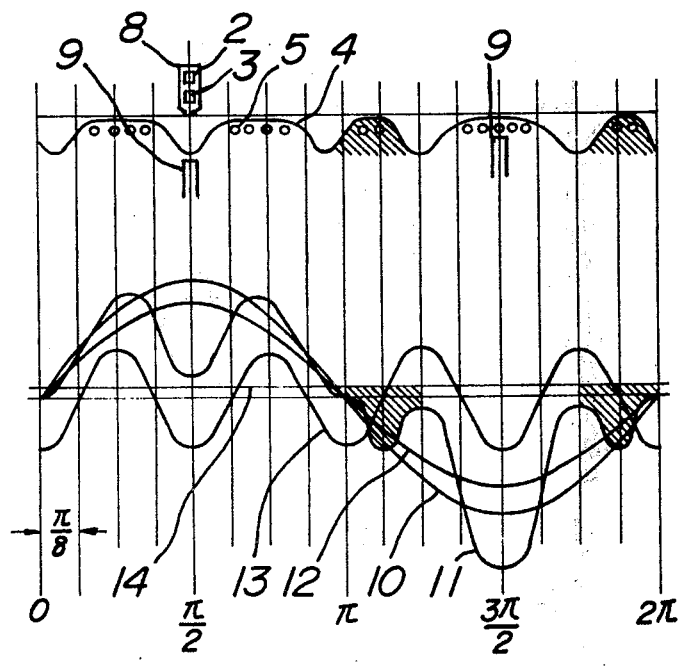
FIG. 6 is a linearly extended view of the air gap of the converter shown in FIG. 5.

FIG. 6 shows a linearly extended view of the rotor pole profile along the air gap as indicated in FIG. 5, together with the magnetomotive force wave 10 of the primary winding, the space flux wave 11, the fundamental flux wave 12, the 4th harmonic flux wave 13, and the dc component 14 included in the space flux wave 11. In FIG. 6, the reference numerals 1, 2, 3, 4, 5, 8, 9 show the same parts as in FIG. 2.

In the embodiment shown in FIG. 4, the space flux wave 11 is nearly zero at the intermediate portion between the convex pole and the concave pole. However, in the embodiment shown in FIG. 6, the space flux wave 11 has a certain value even at said intermediate portion. This is indicated by hatchings in FIG. 6. According to this provision, the 4th harmonic flux wave has a larger value when compared with that embodiment having no additional poles under the same maximum value of the space flux wave.

The following values are quite possible in practice with the pole profile explained above.

$$b_1 = 0.59 \frac{A}{\delta} \frac{4\pi}{10}$$

$$a_4 = 0.37 \frac{A}{\delta} \frac{4\pi}{10}$$

$$K = 0.06$$

This means a larger power of quadruple frequency can be derived from the same stator by providing the aforementioned additional poles.

The other advantage of the additional poles is that it contributes to the removal of vibration which might occur during operation due to an unbalance of the magnetic pulling force in the air gap in the case of two pole rotating machine. It should be noted that such kind of rotating machine is generally designed in two-pole.

In the construction shown in FIG. 4, since the shape of the space flux wave differs for the convex pole and for the concave pole, the magnetic pulling force differs for each pole. The rotor is symmetrical for the direct magnetic axis so the magnetic pulling forces balance each other, however, the rotor is not symmetrical for the quadrature magnetic axis, so the magnetic pulling force becomes unbalanced and the rotor causes vibration during its rotation.

The rotor having the additional poles as shown in FIGS. 5 and 6 can be made to decrease the unbalance of the magnetic pulling force by suitable design of the additional poles. The machine can be made suitable for operation in practice.

By the provision of the additional poles it should be noted on the generator side that the armature reaction slightly increases and also the voltage regulation becomes slightly worse.

In the foregoing explanation, only the case has been discussed when the magnetomotive force axis of the primary winding is coincident with the center of the pole of the rotor. It is true when the load of the generator is kept at zero perfectly. If a load is applied to the generator, the center of the pole of the rotor shows a certain shift by an angle $\gamma$ from the magnetomotive force axis of the primary winding according to the load. The shift angle $\gamma$ is shown in FIG. 7.

Figure 7:
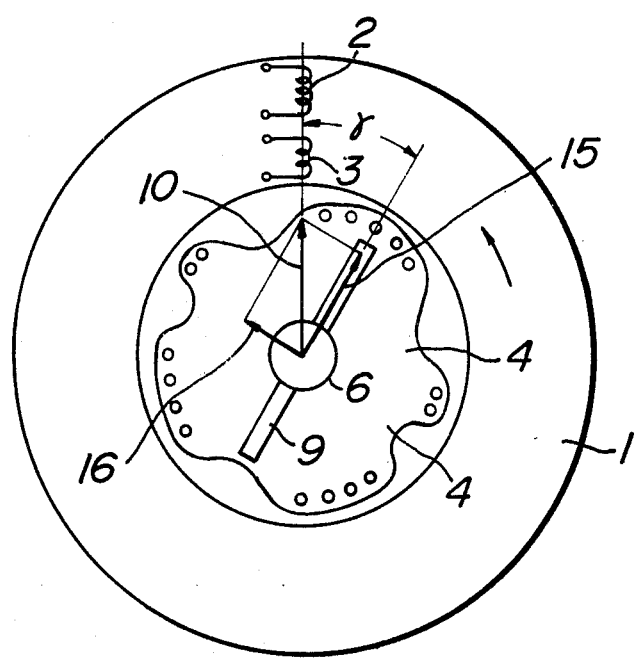
FIG. 7 shows the positional deviation of the rotor when a load is applied to the secondary winding of the converter.

Referring to FIG. 7, the reference numerals 1, 2, 3, 4, 5, 6 and 9 denote the same parts as shown in FIG. 2. The primary winding and the secondary winding are polyphase windings but only one winding for one winding axis is depicted.

In such loaded case, the magnetomotive force 10 produced by the primary winding 2 can be divided into 2 components, i.e. a component 15 which is coincident with the center of the rotor pole (termed the direct axis component) and a component 16 which has a phase shift of $\frac{1}{2}\pi$ therefrom (termed the quadrature axis component). The space flux wave, the fundamental flux wave and the 4th harmonic flux wave produced by the magnetomotive force of each component must be taken into account.

However, the air gap length of the quadrature axis is longer than that of the direct axis in average and the width of the additional poles is narrower the other poles. Furthermore, the rotor core is provided with slits in order to increase magnetic reluctance for the quadrature axis magnetic path so that the space flux wave i.e., the fundamental and the 4th harmonic flux wave produced by the quadrature axis magnetomotive force 16 is very small compared with that produced by the direct axis component. In practice, when deciding the shape of the pole of the rotor, it is sufficient to consider only the effect of the direct axis component.

What is claimed is:

1. A frequency converter of a synchronous rotating machine type, comprising:
    (a) a stator having a polyphase primary winding and a polyphase secondary winding, said primary winding and said secondary winding having a number of poles in the ration of 1 to 4; and
    (b) a freely rotating rotor having a number of salient poles which is the same number as said poles of said primary winding, said salient poles each having center and outer portions and being divided into first and second groups, in which one salient pole of said first group has a center portion providing a narrower air gap between said rotor and said stator than said outer portions of said one salient pole and another salient pole of said second group has a center portion providing a wider air gap between said rotor and said stator than said outer portions of said another salient pole, said rotor further including small poles of said first group which are narrower in width than said one salient pole and located within $\pm\pi 2$ from the center of said one salient pole, whereby said primary winding is cnnectable to an ac source to operate the converter as a synchronous motor and power output machine of quadruple frequency of the source frequency, the quadruple frequency power being derived from said secondary winding.

2. A frequency converter as claimed in claim 1, wherein the rotating machine is a reaction type synchronous machine.

3. A frequency converter as claimed in claim 1, wherein the rotating machine is a claw-pole type synchronous machine.

4. A frequency converter as claimed in claim 1, wherein said stator and said rotor have a substantially large magnetic reluctance except through the air gap.

* * * * *

UNITED STATES PATENT OFFICE
CERTIFICATE OF CORRECTION

Patent No. 4,160,925                     Dated   July 10, 1979

Inventor(s)   Fujio ISHIKAWA

It is certified that error appears in the above-identified patent and that said Letters Patent are hereby corrected as shown below:

Col. 1, line 19, after "by" and before "reason" --the-- should be omitted.

Col. 4, last but one line, it should read $--+2(\alpha - \beta)--$ instead of "$+2(\alpha + \beta)$".

Col. 5, line 46, after "small" and before "at" --and-- is missing.

Col. 7, line 13, after "of" and before "two" --a-- is missing.

Col. 8, line 23, "ration" should read --ratio--.

Col. 8, line 38, "$\pm \pi 2$" should read $--\pm\frac{\pi}{2}--$.

Col. 8, line 39, "cnnectable" should read --connectable--.

Signed and Sealed this

Twenty-second Day of April 1980

[SEAL]

Attest:

SIDNEY A. DIAMOND

Attesting Officer      Commissioner of Patents and Trademarks

UNITED STATES PATENT AND TRADEMARK OFFICE
CERTIFICATE OF CORRECTION

PATENT NO. : 4,160,925
DATED : July 10, 1979
INVENTOR(S) : Fujio Ishikawa

It is certified that error appears in the above—identified patent and that said Letters Patent is hereby corrected as shown below:

Column 4, line 12, "$K = \xi A$" should be --$K = \xi/A$--

Signed and Sealed this

Ninth Day of June 1981

[SEAL]

Attest:

RENE D. TEGTMEYER

Attesting Officer     Acting Commissioner of Patents and Trademarks